United States Patent
Tsukamoto et al.

(10) Patent No.: US 8,319,611 B2
(45) Date of Patent: Nov. 27, 2012

(54) RADIO FREQUENCY INDENTIFICATION TAG

(75) Inventors: Takayuki Tsukamoto, Tokyo (JP); Mutsuya Motojima, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 750 days.

(21) Appl. No.: 12/244,842

(22) Filed: Oct. 3, 2008

(65) Prior Publication Data
US 2009/0134979 A1    May 28, 2009

(30) Foreign Application Priority Data
Nov. 28, 2007   (JP) .................................. 2007-307000

(51) Int. Cl.
*H04Q 5/22* (2006.01)
(52) U.S. Cl. .................................................... 340/10.34
(58) Field of Classification Search ................. 340/10.4, 340/825.54, 10.34; 235/487; 343/872
See application file for complete search history.

(56) References Cited

U.S. PATENT DOCUMENTS

| 6,193,164 B1 * | 2/2001 | Arisawa ........................ 235/492 |
| 8,198,983 B2 | 6/2012 | Watanabe et al. |
| 2004/0104809 A1 * | 6/2004 | Rizzo et al. ................. 340/10.34 |
| 2005/0052279 A1 | 3/2005 | Bridgelall |
| 2006/0273882 A1 * | 12/2006 | Posamentier ................. 340/10.4 |
| 2009/0091508 A1 * | 4/2009 | Fabrega-Sanchez et al. . 343/872 |

FOREIGN PATENT DOCUMENTS

| JP | 11250210 | 9/1999 |
| JP | 2004-54515 | 2/2004 |
| JP | 2007-504537 | 3/2007 |
| JP | 200758381 | 3/2007 |
| JP | 2007293423 | 11/2007 |

OTHER PUBLICATIONS

JP Office Action in JP Application No. 2007-307000, dated Jul. 31, 2012.

* cited by examiner

*Primary Examiner* — Jennifer Mehmood
*Assistant Examiner* — Kaleria Knox
(74) *Attorney, Agent, or Firm* — Mattingly & Malur, PC

(57) ABSTRACT

An ID tag has a stable internal supply voltage and extends the range of communication with the reader/writer during back scattering communication. An ASK-modulated signal pre-boost circuit to which antenna terminals are coupled is coupled in parallel with a rectifying circuit. In the ASK-modulated signal pre-boost circuit, a switch for back scattering, working as a modulator element, is provided. During back scattering communication, when a back scattering signal "1" is transmitted, only the current flowing in the signal receiving path of the modulation/demodulation unit is wasted by turning the switch for back scattering on. Additional current loss other than the loss for impedance matching can be prevented.

6 Claims, 8 Drawing Sheets

RADIO FREQUENCY INDENTIFICATION TAG

CROSS-REFERENCE TO RELATED APPLICATIONS

The disclosure of Japanese Patent Application No. 2007-307000 filed on Nov. 28, 2007 including the specification, drawings and abstract is incorporated herein by reference in its entirety.

BACKGROUND OF THE INVENTION

The present invention relates to a communication technique for RFID (Radio Frequency Identification) systems and, particularly, to a technique that is effective for improving the quality of communication for transferring data from/to an ID tag (identification tag).

RFID is disseminating as an automatic identification technique in which data can be transferred by wireless communication. An RFID system comprises an ID tag capable of storing information and a read/writer that performs reading and writing information from/to the ID tag. An ID tag comprises a semiconductor integrated circuit device such as, e.g., a non-contact IC chip, and an antenna.

The ID tag receives radio waves output from the read/writer and a rectifying circuit in the ID tag generates an internal supply voltage VDD by rectifying and stabilizing the radio waves received by the antenna. This internal supply voltage VDD is supplied to internal circuits (such as a logical circuit) in the ID tag.

Communication between the ID tag and the reader/writer is performed by modulating radio waves output from the read/writer. Communication from the read/writer to the ID tag is performed such that the radio waves output from the read/writer is ASK (Amplitude Shift Keying) modulated and demodulated in the tag.

A way of communication from the ID tag to the read/writer using a back scattering method is known. This back scattering method is accomplished by changing the input impedance of the ID tag. The input impedance change results in a change in the reflectivity coefficient of the ID tag, which in turn changes the power of the radio waves being reflected to the read/writer.

One known implementation of the back scattering method is such that a switch for back scattering, which comprises, for example, a MOS transistor, is inserted between the antenna terminals of the ID tag (in a path for supplying current to internal circuits).

By turning this switch for back scattering on (to conduct current), which changes the impedance between the antenna terminals of the ID tag and causes an impedance mismatch, a back scattering communication is achieved.

As for this type of communication technique for ID tags by using the back scattering method, an ID tag including a diode switch provided within a rectifier to control back scattering is known (for example, refer to Patent Document 1).
[Patent Document 1]
Japanese Unexamined Patent Publication No. 2004-54515

SUMMARY OF THE INVENTION

However, the inventors have found that the above-described communication technique by means of backscattering for RFID systems has the following problems.

Current consumed by an internal circuit in an ID tag remains unchanged during back scattering communication and it is therefore desired that a rectification circuit continues to supply current to the internal circuit even during back scattering communication.

However, during back scattering communication, the antenna terminals are short-circuited by the switch for back scattering short circuits and, therefore, this shuts off the input of power to the rectification circuit following the antenna. This poses a problem that the rectification circuit becomes unable to supply current to the internal circuit during back scattering communication.

A power supply capacitor such as a static capacitor is provided in the ID tag and charges on the capacitor are supplied as a supply voltage VDD to the internal circuit current, in case the amount of current supply from the rectification circuit is reduced. If the power that is supplied from the capacitor falls to a voltage blow an operating limit, the ID tag would not operate.

In consequence, such a voltage drop inside the ID tag largely affects the communication range of the ID tag during back scattering communication.

As in Patent Document 1, in the case that the switch for back scattering is provided within the rectification circuit for supplying current to the internal circuit, instead of being provided between the antenna terminals, an input impedance mismatch causes the switch for back scattering, when turned on, to withdraw current for providing the supply voltage VDD.

In consequence, the current to be supplied as the supply voltage VDD is wasted, as in the case where the switch for back scattering is provided between antenna terminals, and substantially no current would be supplied from the rectification circuit.

Furthermore, if the distance between the ID tag and the reader/writer in communication is very short, the receiving power at the ID tag becomes large and a large voltage is applied to the elements of the rectification circuit. To assure the voltage proofness of the elements of the rectification circuit, a protection circuit is generally added to the rectification circuit. The protection circuit withdraws current only in case of large power input to the rectification circuit and decreases the potentials of the elements of the rectification circuit.

This type of protection circuit includes diode-coupled MOS transistors which are coupled in series and is coupled between an output terminal of the rectification circuit and a reference potential VSS. In case that large power is input to the rectification circuit, most of the input current flows in a current withdrawing path from the protection circuit. Even if the switch for back scattering is turned on, it would be impossible to cause a significant change in input impedance. A resulting problem is that a sufficient strength of back scattering cannot be attained.

An object of the present invention is to provide a technique that enables a stable supply of an internal supply voltage and extending the ID tag communication range during back scattering communication.

The above-noted object and other objects and novel features of the present invention will become apparent from the following description in the present specification and the accompanying drawings.

Typical aspects of the invention disclosed in this application are summarized as follows.

One aspect of the present invention resides in an ID tag that converts radio power received from a reader/writer into operating power and performs back scattering communication to transmit information to the reader/writer, the ID tag comprising an antenna for transmitting and receiving a radio signal to/from the reader/writer; a rectifying circuit that is coupled to the antenna and rectifies the electromagnetically induced power of radio waves output from the read/writer and received by the antenna and generates a primary voltage; a voltage stabilizing circuit that generates an internal supply voltage by stabilizing the primary voltage generated by the rectifying circuit and supplies the internal supply voltage to an internal circuit; and a switch for back scattering that changes the impedance of the antenna, thereby causing an impedance mismatch, when the ID tag carries out back scattering communication, wherein the switch for back scattering is provided in an internal circuit coupled in parallel with the rectifying circuit.

In another aspect of the invention, the internal circuit coupled in parallel with the rectifying circuit is an ASK-modulated signal pre-boost circuit that boosts and rectifies a radio signal output from the reader/writer and received by the antenna and performs envelope detection on the radio signal and the switch for back scattering is provided in the ASK-modulated signal pre-boost circuit.

In a further aspect of the invention, the switch for back scattering is coupled between an output terminal of the ASK-modulated signal pre-boost circuit and a reference potential.

In another aspect of the invention, the ID tag further includes a level shifter that converts the level of a control signal for controlling the operation of the switch for back scattering, wherein the level shifter provides the primary voltage generated by the rectifying circuit to drive the switch for back scattering.

In a further aspect of the invention, the internal circuit coupled in parallel with the rectifying circuit comprises a boost circuit for memory that boosts and rectifies a radio signal output from the reader/writer and received by the antenna, thereby generating a boosted supply voltage, and supplies this voltage to a memory unit for storing information as an operating voltage of the memory unit.

Other aspects of the invention of the present application are summarized below.

A still further aspect of the invention resides in an ID tag that converts radio power received from a reader/writer into operating power and performs back scattering communication to transmit information to the reader/writer, the ID tag comprising an antenna for transmitting and receiving a radio signal to/from the reader/writer; a first rectifying circuit that is coupled to the antenna and rectifies the electromagnetically induced power of radio waves output from the read/writer and received by the antenna and generates a primary voltage; a first voltage stabilizing circuit that generates an internal supply voltage by stabilizing the primary voltage generated by the first rectifying circuit and supplies the internal supply voltage to a first internal circuit; a second rectifying circuit that is coupled in parallel with the first rectifying circuit and rectifies the electromagnetically induced power of radio waves output from the read/writer and received by the antenna and generates a primary voltage; a second voltage stabilizing circuit that generates an internal supply voltage by stabilizing the primary voltage generated by the second rectifying circuit and supplies the internal supply voltage to a second internal circuit; and a switch for back scattering that changes the impedance of the antenna, thereby causing an impedance mismatch, when the ID tag carries out back scattering communication, wherein the switch for back scattering is provided in the second rectifying circuit coupled in parallel with the first rectifying circuit In another aspect of the invention, the above first internal circuit comprises a clock generating circuit that generates and supplies a reference clock to logic circuits and the above second internal circuit comprises the logic circuits.

In a further aspect of the invention, the ID tag further includes an ASK-modulated signal pre-boost circuit that is coupled in parallel with the first rectifying circuit and boosts and rectifies a radio signal output from the reader/writer and received by the antenna and performs envelope detection on the radio signal.

Effects obtained by typical aspects of the invention disclosed in the present application are outlined below.

(1) It is possible to extend the range allowing communication between the ID tag and the reader/writer during back scattering communication.

(2) It is possible to attain a sufficient strength of back scattering even if the receiving power is large in very short distance communication.

(3) It is possible to improve the quality of communication carried out in an RFID system, owing to the advantages set forth in (1) and (2).

DETAILED DESCRIPTION OF THE PREFERRED EMBODIMENTS

Embodiments of the present invention will now be described in detail based on the drawings. In all drawings for illustrating the embodiments, for same components, in principle, same reference numbers are assigned and their repeated description is omitted.

First Embodiment

Figure 1:
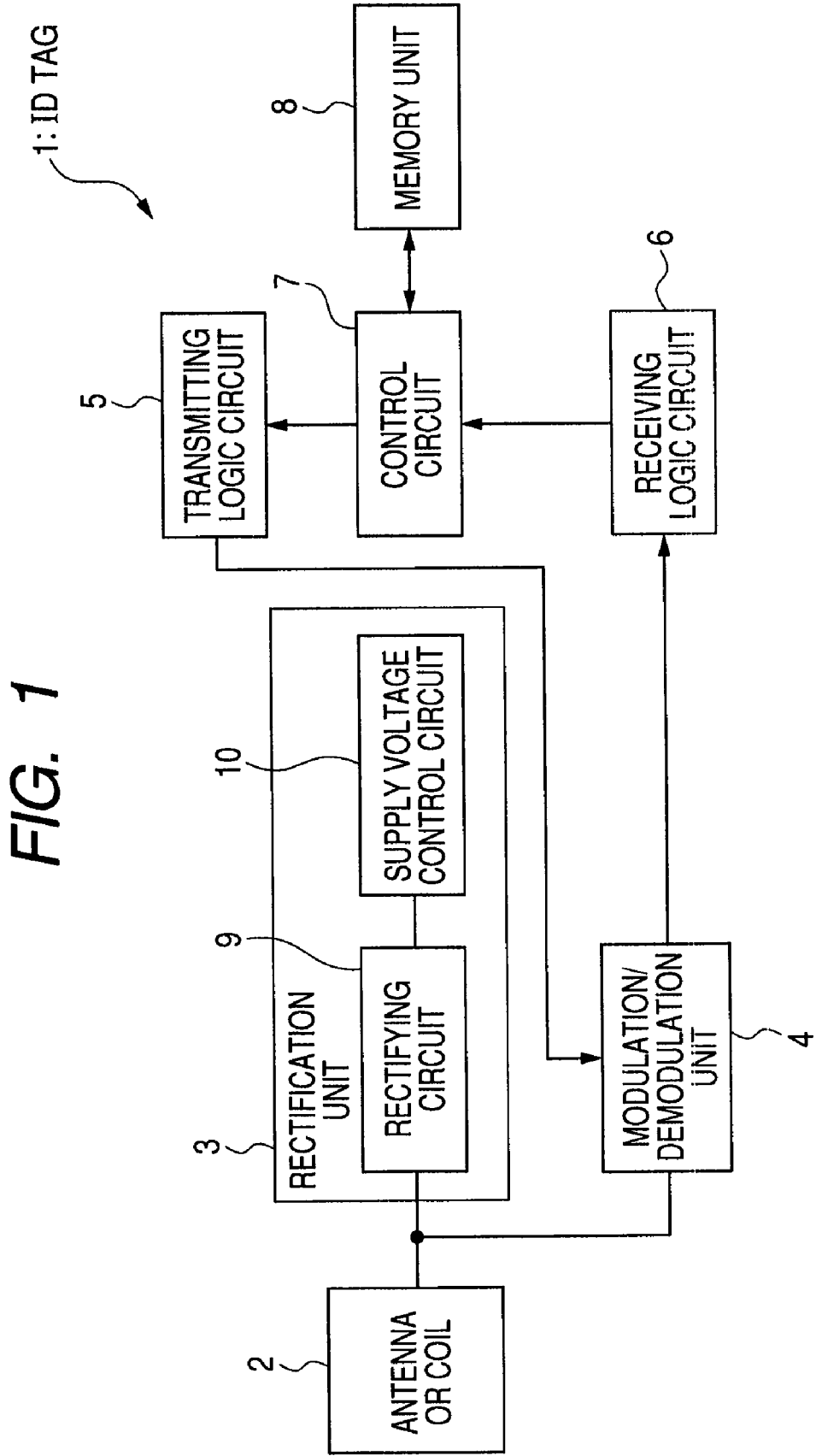
FIG. 1 is a block diagram showing an ID tag configuration according to a first embodiment of the present invention.
Figure 2:
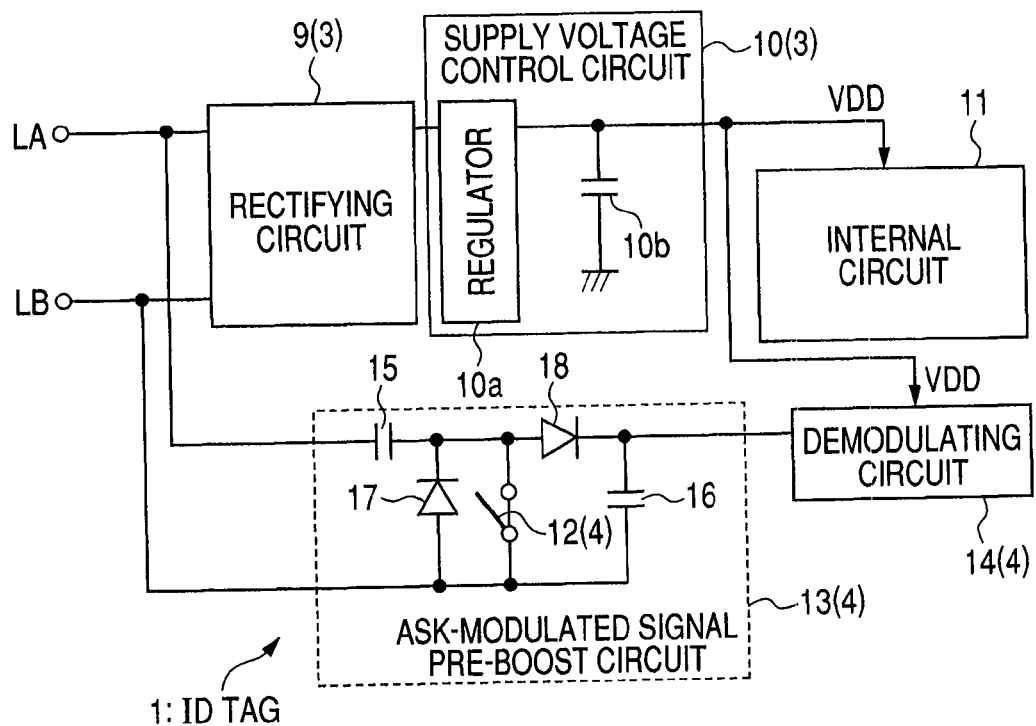
FIG. 2 is a diagram illustrating an example of a configuration for a rectification unit and a modulation/demodulation unit in the ID tag of FIG. 1.
Figure 3:
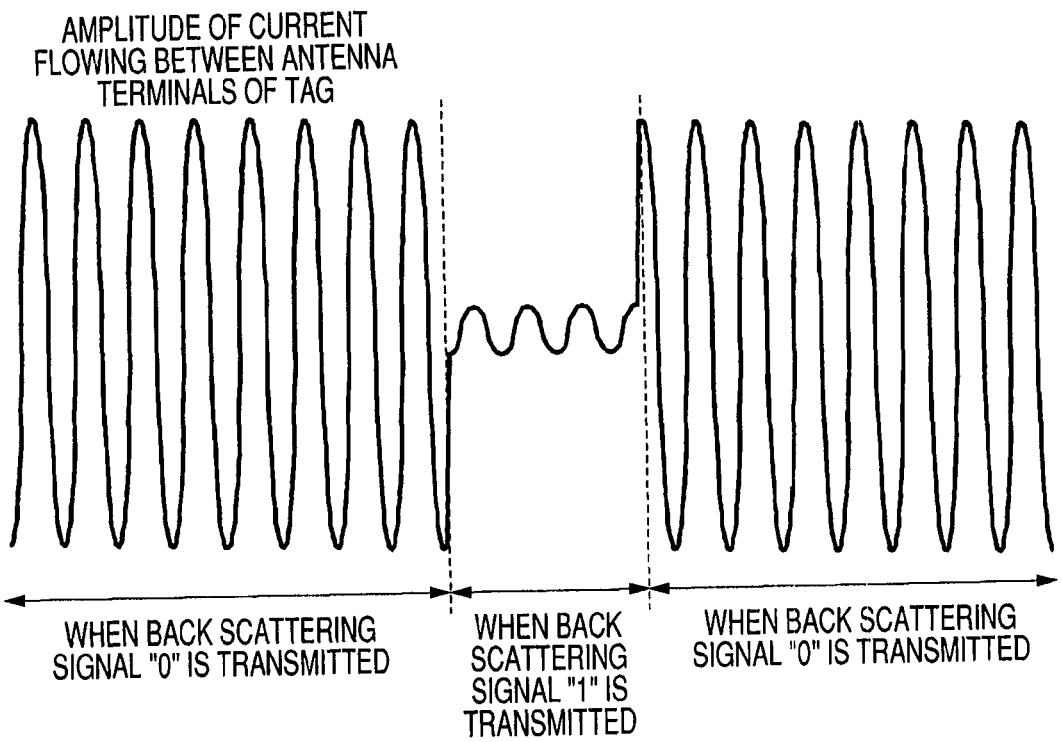
FIG. 3 is a diagram for a back scattering signal transmitted by the ID tag during back scattering communication.

FIG. 1 is a block diagram showing an ID tag configuration according to a first embodiment of the present invention. FIG. 2 is a diagram illustrating an example of a configuration for a rectification unit and a modulation/demodulation unit in the ID tag of FIG. 1. FIG. 3 is a diagram for a back scattering signal transmitted by the ID tag during back scattering communication.

In the first embodiment, the ID tag 1 is used for RFID, an automatic identification technique. The ID tag 1, as shown in FIG. 1, is comprised of an antenna 2, a rectification unit 3, a modulation/demodulation unit 4, a transmitting logic circuit 5, a receiving logic circuit 6, a control circuit 7, and a memory unit 8.

The rectification unit 3 generates an internal supply voltage VDD that is used as the operating power from radio waves received by the antenna 2. The rectification unit 3 supplies the VDD to the modulation/demodulation unit 4, transmitting logic circuit 5, the receiving logic circuit 6, the control circuit 7, and the memory unit 8.

The rectification unit 3 is comprised of a rectifying circuit 9 and a supply voltage control circuit 10. The rectifying circuit 9 boosts and rectifies radio power received by the antenna 2. The supply voltage control circuit 10 stabilizes a voltage rectified by the rectifying circuit 9 and outputs it as the internal supply voltage VDD.

The modulation/demodulation unit 4 is comprised of a modulator and a demodulator. The modulator modulates reflection waves (back scattering) by changing the impedance of an antenna terminal to which the antenna 2 is coupled according to data.

The demodulator demodulates a carrier signal modulated by ASK (Amplitude Shift Keying) transmitted from a reader/writer that performs reading and writing information from/to the ID tag. By the demodulation, the demodulator converts command data and other data added to the carrier signal by ASK (Amplitude Shift Keying) modulation into a digital signal and outputs the digital signal to the receiving logic circuit 6.

The transmitting logic circuit 5 retrieves data from the memory unit 8, as needed, upon receiving an instruction indicating whether to send a response, a response type, and response parameters. Depending of a rate of transmission of response data, the transmitting logic circuit 5 operates a switch 12 for back scattering (FIG. 2) in the modulation/demodulation unit 4.

The receiving logic circuit 6 interprets a command represented by a signal demodulated by the modulation/demodulation unit 4. Based on the command interpreted by the receiving logic circuit 6, the control circuit 7 controls an operation for reading/writing information from/to the memory unit 8 and executes reading/writing of information.

The memory unit 8 comprises a nonvolatile memory such as, e.g., EEPROM (Electrically Erasable and Programmable Read Only Memory) and diverse data and the like are stored therein.

FIG. 2 is a diagram illustrating a configuration for the rectification unit 3 and modulation/demodulation unit 4 in the ID tag 1.

The voltage (primary voltage) rectified by the rectifying circuit 9 is stabilized by the supply voltage control circuit 10 and output as the internal supply voltage VDD to the modulation/demodulation unit 4 and an internal circuit 11 comprising the transmitting logic circuit 5, receiving logic circuit 6, control circuit 7, and memory unit 8.

The supply voltage control circuit 10 is comprised of a regulator 10a and a static capacitor 10b. The regulator 10a serving as a voltage stabilizing circuit stabilizes the voltage rectified by the rectifying circuit 9 and generates the supply voltage VDD. The static capacitor 10b is coupled between an output terminal of the regulator 10a and a reference potential VSS. This static capacitor 10b stores charges and supplies power to the modulation/demodulation unit 4 and the internal circuit 11 in the event of a significant reduction in the current supplied from the regulator 10a.

Antenna terminals LA, LB are coupled to the input side of the rectifying circuit 9. One end of the antenna 2 is coupled to the antenna terminal LA and the other end of the antenna 2 is coupled to the antenna terminal LB.

The modulation/demodulation unit 4 is comprised of the modulator including the switch 12 for back scattering and the demodulator including an ASK-modulated signal pre-boost circuit 13 and a demodulating circuit 14. The switch 12 for back scattering comprises a MOS (Metal Oxide Semiconductor) transistor and is switched between on and off under control of the transmitting logic circuit 5 during back scattering communication for transmission of data from the ID tag 1 to the reader/writer.

The ASK-modulated signal pre-boost circuit 13 boosts and rectifies a radio signal output from the reader/writer and performs envelope detection on the radio signal. The demodulating circuit 14 ASK-demodulates the detected signal output from the ASK-modulated signal pre-boost circuit 13 and converts it into a digital signal.

The ASK-modulated signal pre-boost circuit 13 is comprised of static capacitors 15, 16 and diodes 17, 18. The ASK-modulated signal pre-boost circuit 13 also includes the switch 12 for back scattering which is a modulator element.

To one connection terminal of the static capacitor 15, the antenna terminal LA is coupled. To the other connection terminal of the static capacitor 15, the cathode of the diode 17, the anode of the diode 18, and the one connection terminal of the switch 12 for back scattering are coupled.

To the cathode of the diode 18, one connection terminal of the static capacitor 16 is coupled. The cathode of the diode 18 serves as the output terminal of the ASK-modulated signal pre-boost circuit 13. The antenna terminal LB is coupled to the anode of the diode 17, to the other connection terminal of the switch 12 for back scattering, and to the other connection terminal of the static capacitor 16.

In the following, an explanation is provided for the function of the switch 12 for back scattering according to the present embodiment.

FIG. 3 is a diagram for a back scattering signal during back scattering communication. The signal shown in FIG. 3 represents the amplitude of current flowing between the antenna terminals LA, LB.

In back scattering communication, as shown, for transmitting a back scattering signal "1" by the ID tag 1, the switch 12 for back scattering is turned on under the control of the transmitting logic circuit 5. The turn-on of the switch 12 changes the impedance between the antenna terminals to cause an impedance mismatch, thereby increasing the reflectivity coefficient.

For transmitting a back scattering signal "0" by the ID tag 1, the transmitting logic circuit 5 turns the switch 12 for back scattering off, thereby decreasing the reflectivity coefficient.

The switch 12 for back scattering is provided in the ASK-modulated signal pre-boost circuit 13 which is on another path provided in parallel with a path including the rectifying circuit 9 for supplying current to the internal supply voltage VDD and other circuits. This provision of the switch 12 on another path makes is possible to prevent the current to be supplied to the internal supply voltage VDD from being withdrawn from the path of the rectification unit 3, when the switch 12 for back scattering is turned on and the back scattering signal "1" is transmitted during back scattering communication.

Therefore, only the current flowing in the signal receiving path of the modulation/demodulation unit 4 is wasted by turning the switch 12 for back scattering on during back scattering communication.

From the above, when the switch 12 for back scattering is turned on, additional current loss other than the loss for impedance matching can be prevented. The provision of the switch 12 for back scattering in the ASK-modulated signal pre-boost circuit 13 does not have an adverse effect on the demodulator, because ASK-modulated signal reception and back scattering communication take place at different timing.

Further, unlike the rectification unit 3, the ASK-modulated signal pre-boost circuit 13 is not configured to supply a large voltage and, therefore, does not require a path for withdrawing a large current, as provided in the rectifying circuit 9. Hence, it is easy to attain a sufficient strength of back scattering even if the receiving power is large.

In this way, according to the first embodiment, it is possible to extend the range allowing back scattering communication between the ID tag 1 and the reader/writer.

Further, a sufficient strength of back scattering can be obtained, even when the distance between the ID tag and the reader/writer in communication is very short.

Second Embodiment

Figure 4:
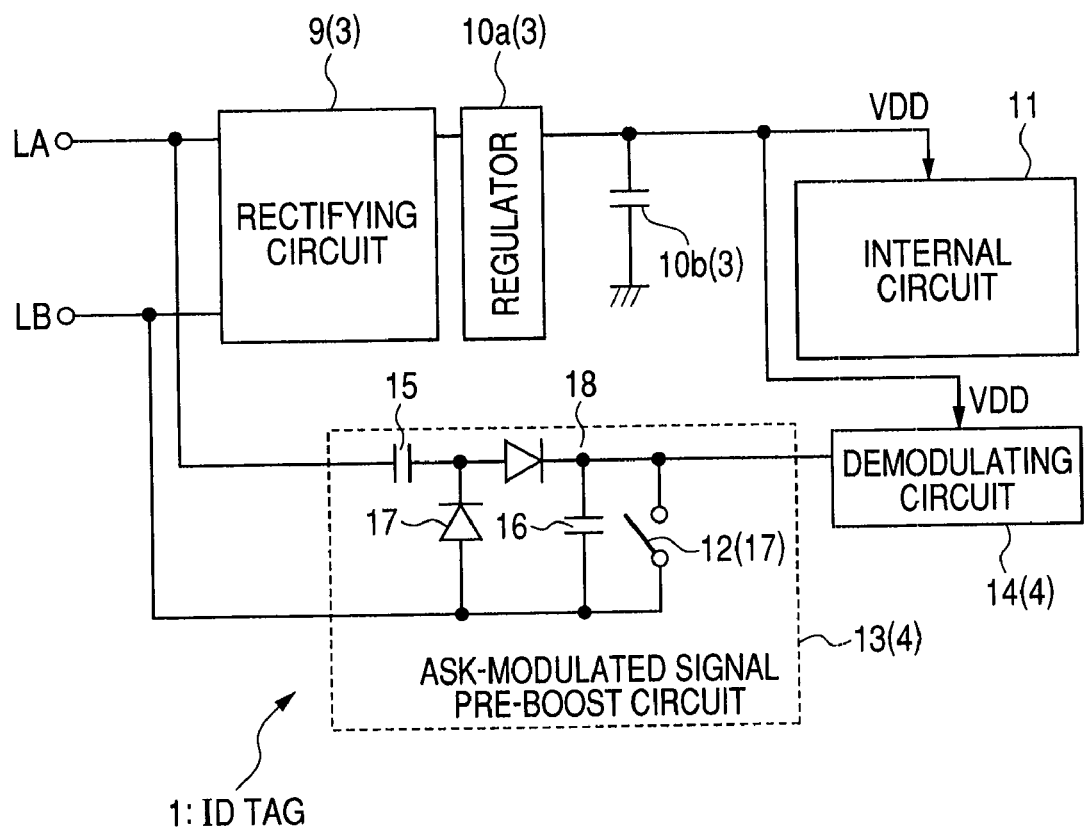
FIG. 4 is a diagram illustrating an example of circuitry including an ASK-modulated signal pre-boost circuit and a switch for back scattering provided in an ID tag according to a second embodiment of the present invention.
Figure 5:
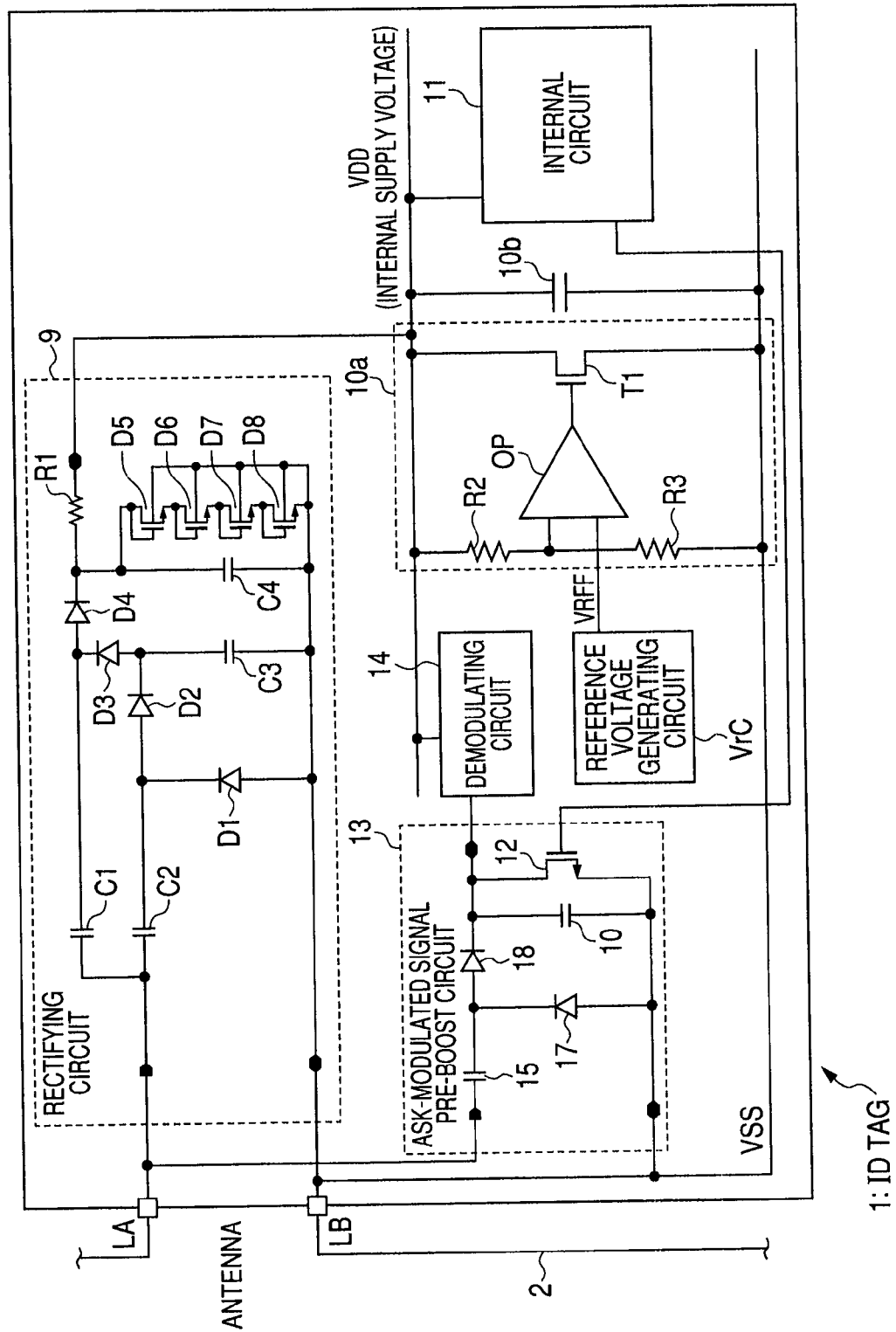
FIG. 5 is a circuit diagram showing a configuration example for a rectification unit and a modulation/demodulation unit shown in FIG. 4.

FIG. 4 is a diagram illustrating an example of circuitry including an ASK-modulated signal pre-boost circuit and a switch for back scattering provided in an ID tag according to a second embodiment of the present invention. FIG. 5 is a circuit diagram showing a configuration example for a rectification unit and a modulation/demodulation unit shown in FIG. 4.

In the second embodiment, the ID tag 1 (FIG. 1) is comprised of an antenna 2, a rectification unit 3, a modulation/demodulation unit 4, a transmitting logic circuit 5, a receiving logic circuit 6, a control circuit 7, and a memory unit 8 in the same way as the foregoing first embodiment.

The rectification unit 3 is comprised of a rectifying circuit 9, a regulator 10a, and a static capacitor 10b, as is the case for the foregoing first embodiment. The modulation/demodulation unit 4 is comprised of a switch 12 for back scattering (modulator element) and a demodulator comprising an ASK-modulated signal pre-boost circuit 13 and a demodulating circuit 14, as is the case for the foregoing first embodiment.

Again, the ASK-modulated signal pre-boost circuit 13 is comprised of static capacitors 15, 16 and diodes 17, 18. The switch 12 for back scattering is provided in the ASK-modulated signal pre-boost circuit 13. A difference from the foregoing first embodiment is the coupling position of the switch 12 for back scattering.

FIG. 4 is a diagram illustrating an example of circuitry including the ASK-modulated signal pre-boost circuit 13 and the switch 12 for back scattering.

In this case, the switch 12 for back scattering is coupled between the output terminal of the ASK-modulated signal pre-boost circuit 13 and the reference potential VSS, not between the diodes 17, 18 shown in FIG. 2. One connection terminal of the switch 12 for back scattering is coupled to one connection terminal of the static capacitor 16 and the other connection terminal of the switch 12 for back scattering is coupled to the other connection terminal of the static capacitor 16.

Considering the coupling position of the switch 12 for back scattering in the above first embodiment, a large amplitude arises with operation of a rectifying circuit formed by the diodes 17, 18 and extra power is consumed by parasitic capacitance, parasitic resistance, and the like of the MOS transistor that provides the switch 12 for back scattering. The coupling position of the switch 12 for back scattering shown in FIG. 4 enables substantially avoiding the amplitude due to the rectifying circuit and preventing extra power consumption.

FIG. 5 is a circuit diagram showing a configuration example for the rectification unit 3 and the modulation/demodulation unit 4 in the ID tag 1 to which the present invention is applied.

The rectifying circuit 9 is comprised of static capacitors C1 to C4, diodes D1 to D8, and a resistor RI. The antenna terminal LA is coupled to one connection terminal of each of static capacitors C1, C2 which form a charge pumping circuit.

To the other connection terminal of the static capacitor C1, the anode of the diode D4 and the cathode of the diode D3 are coupled. To the other connection terminal of the static capacitor C2, the cathode of the diode D1 and the anode of the diode D2 are coupled.

To the cathode of the diode D2, the anode of the diode D3 and one connection terminal of the static capacitor C3 are coupled. To the cathode of the diode D4, one connection terminal of the static capacitor C4 and the anode of the diode D5 are coupled.

To the cathode of the diode D5, the anode of the diode D6 is coupled. To the cathode of the diode D6, the anode of the diode D7 is coupled. To the cathode of the diode D7, the anode of the diode D8 is coupled.

The antenna terminal LB is coupled to the anode of the diode D1, to the other connection terminal of each of the static capacitors C3, C4, and to the cathode of the diode D8. The diodes D5 to D8 are arranged to form a circuit comprising, for example, diode-coupled MOS transistors. This circuit is a protection circuit for withdrawing current in case a large power is input to the rectifying circuit 9.

The ASK-modulated signal pre-boost circuit 13 is comprised of static capacitors 15, 16 and diodes 17, 18 and their connection is as shown in FIG. 4. In FIG. 5, the switch 12 for back scattering is represented by a MOS transistor.

Then, the regulator 10a is comprised of resistors R2, R3, an operational amplifier OP, a transistor T1, and a reference voltage generating circuit VrC. To the other connection terminal of the resistor R1 (the output terminal of the rectifying circuit 9), one connection terminal of the transistor T1 which is a MOS transistor for clamping and one connection terminal of the resistor R2 are coupled. This connection terminal also serves as the output terminal of the regulator 10a and is coupled to the demodulating circuit 14 and the VDD input terminal of the internal circuit 11.

To the other connection terminal of the resistor R2, one connection terminal of the resistor R3 and one input terminal of the operational amplifier OP are coupled. The reference voltage generating circuit VrC generates a reference voltage VREF.

To the other input terminal of the operational amplifier OP, the reference voltage VREF generated by the reference voltage generating circuit VrC is input. The antenna terminal LB is coupled to the other connection terminal of the resistor R3 and the other connection terminal of the transistor T1.

To one connection terminal of the static capacitor 10b, one connection terminal of the transistor T1 is coupled. To the other connection terminal of the static capacitor 10b, the other connection terminal of the transistor T1 is coupled.

In this way, according to the second embodiment, it is possible to further extend the range of communication between the ID tag 1 and the reader/writer.

Third Embodiment

Figure 6:
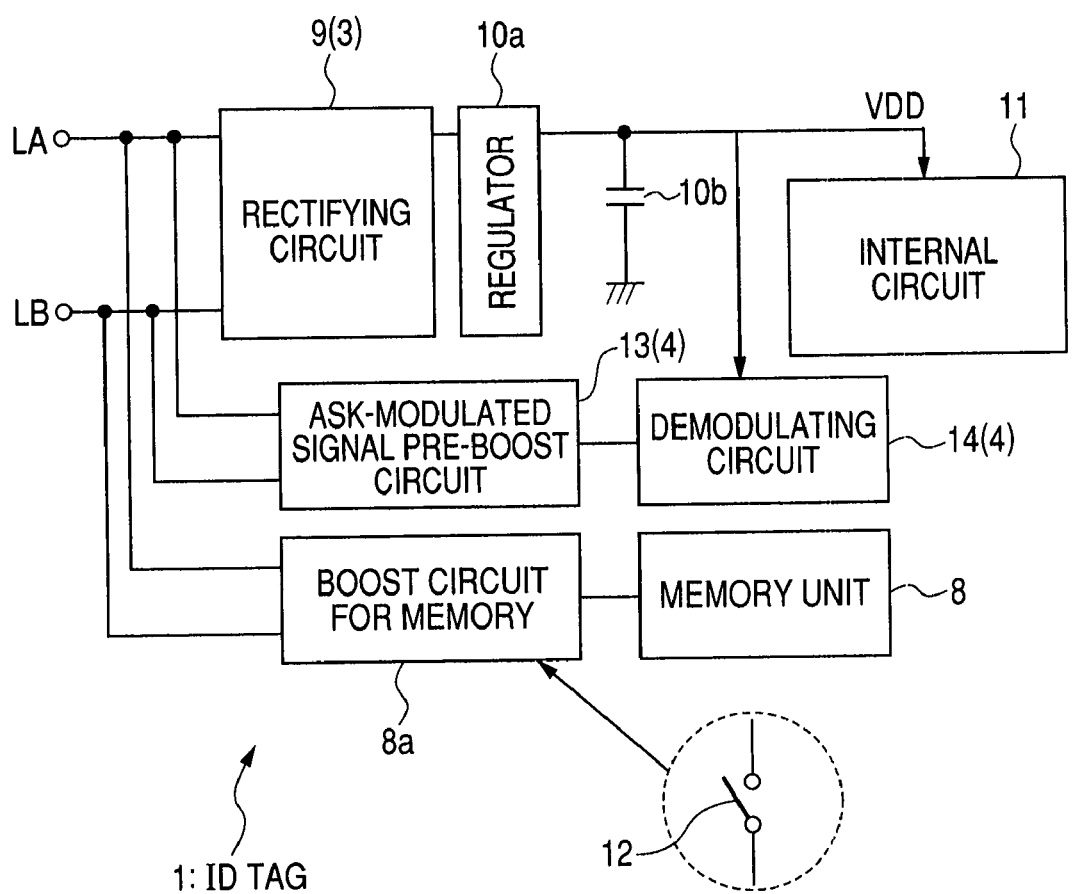
FIG. 6 is a diagram illustrating a configuration for a rectification unit, a modulation/demodulation unit, a memory unit, a boost circuit for memory, and an internal circuit provided in an ID tag according to a third embodiment of the present invention.

FIG. 6 is a diagram illustrating a configuration for a rectification unit, a modulation/demodulation unit, a memory unit, a boost circuit for memory, and an internal circuit provided in an ID tag according to a third embodiment of the present invention.

In the third embodiment, the ID tag 1 comprises an antenna 2, a rectification unit 3, a modulation/demodulation unit 4, a transmitting logic circuit 5, a receiving logic circuit 6, a control circuit 7, and a memory unit 8 in the same configuration as for the above first embodiment, and further includes a boost circuit for memory 8a for supplying power to the memory unit 8.

FIG. 6 is a diagram illustrating the configuration for the rectification unit 3, modulation/demodulation unit 4, memory unit 8, and boost circuit for memory in the ID tag 1.

In this case, the switch 12 for back scattering is provided in the boost circuit for memory 8a, which is different from the above first embodiment, instead of being provided in the ASK-modulated signal pre-boost circuit 13 in the modulation/demodulation unit 4.

Antenna terminals LA and LB are coupled to the input terminal of the boost circuit for memory 8a coupled in parallel with the rectifying circuit 9. The boost circuit for memory 8a generates a boosted supply voltage from radio power received by the antenna 2 and supplies this voltage to the memory unit 8 which in turn operates on this voltage.

Other connections are the same as for the above first and second embodiments and, therefore, their description is not repeated.

In this way, in the third embodiment, it is also possible to extend the range allowing back scattering communication between the ID tag 1 and the reader/writer.

Figure 7:
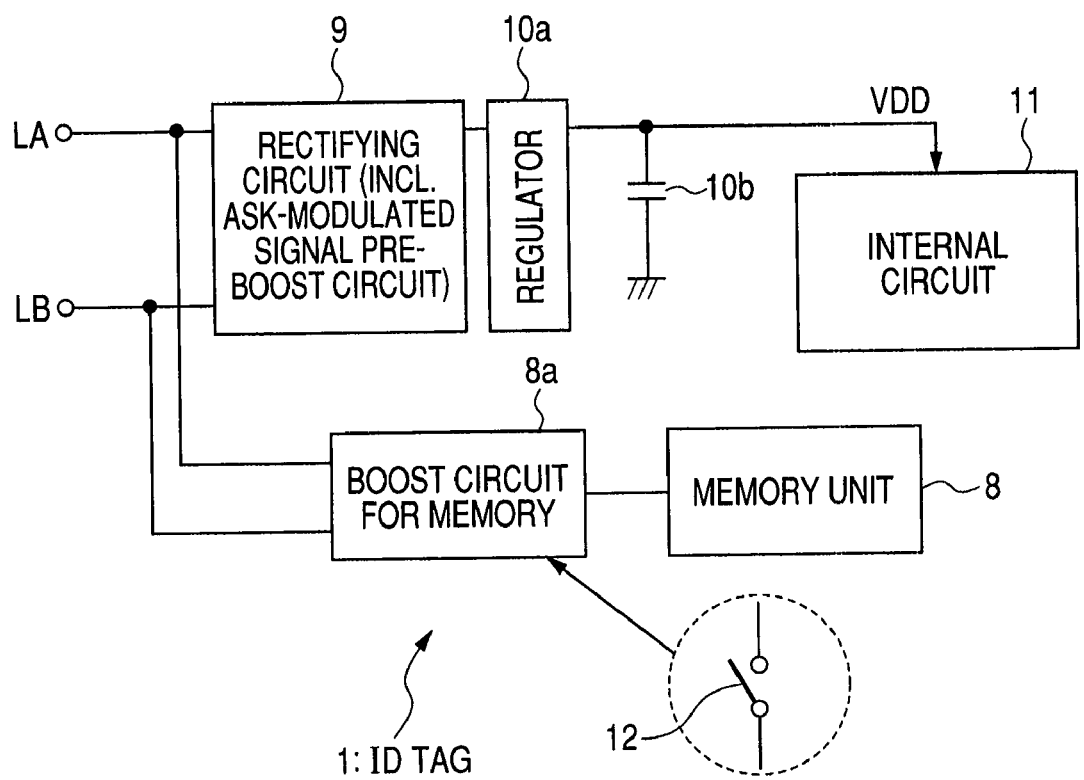
FIG. 7 is a diagram illustrating a configuration for a rectification unit, a modulation/demodulation unit, a memory unit, a boost circuit for memory, and an internal circuit provided in an ID tag according to a further embodiment of the present invention.

In the configuration of the third embodiment, the ASK-modulated signal pre-boost circuit 13 does not need to include the switch 12 for back scattering. Accordingly, for example, as is shown in FIG. 7, the ASK-modulated signal pre-boost circuit 13 (which is not shown explicitly) may be incorporated in the rectifying circuit 9.

Fourth Embodiment

Figure 8:
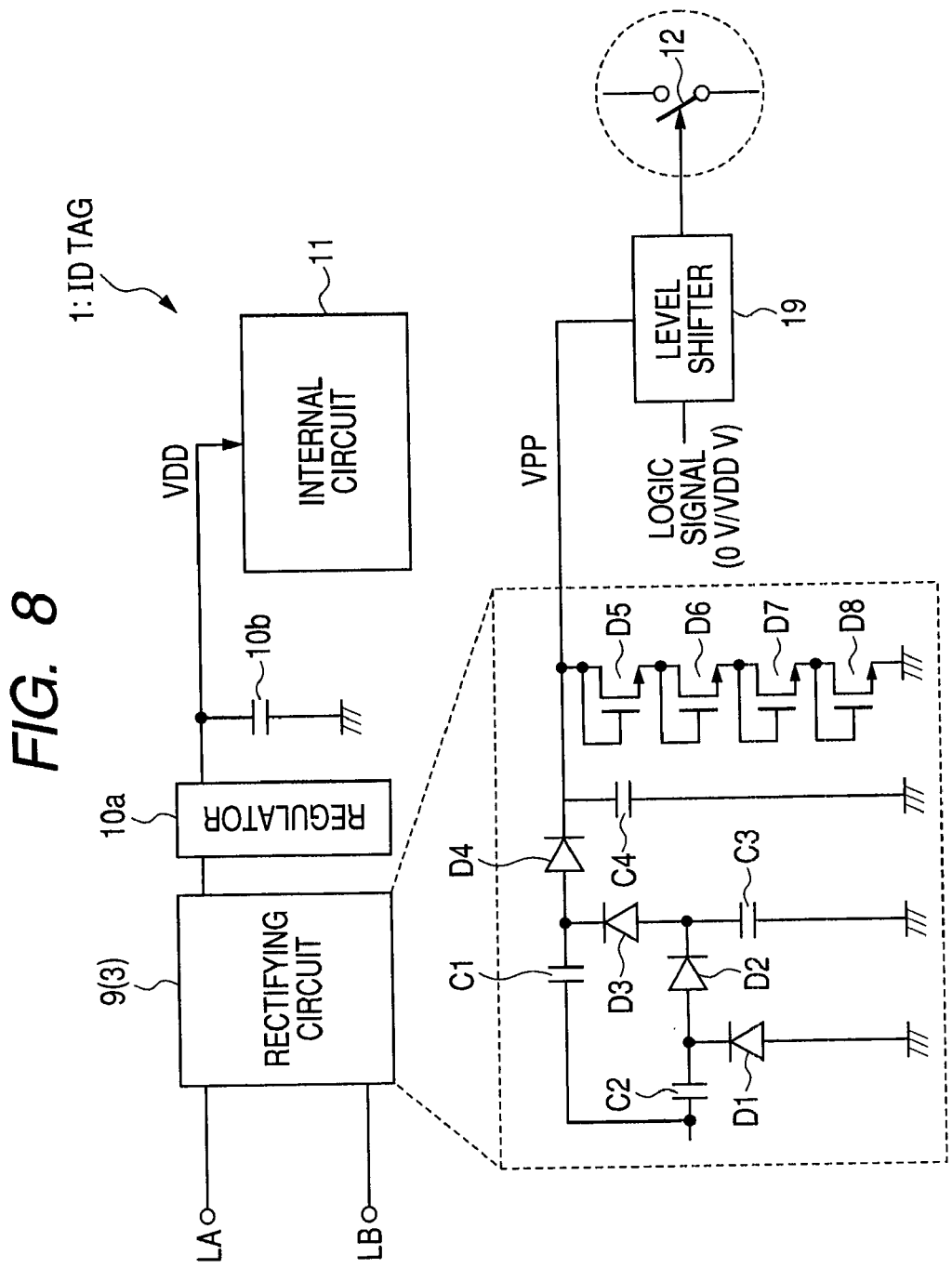
FIG. 8 is a diagram illustrating an example of a configuration for a rectification unit and a modulation/demodulation unit in an ID tag according to a fourth embodiment of the present invention.

FIG. 8 is a diagram illustrating an example of a configuration for a rectification unit and a modulation/demodulation unit in an ID tag according to a fourth embodiment of the present invention.

In the fourth embodiment, the ID tag further includes a level shifter 19 in addition t the configuration of the first embodiment 1 shown in FIG. 2. The level shifter 19 converts the level of a control signal for the switch 12 for back scattering, having the amplitude of the internal supply voltage VDD relative to the reference potential VSS, which is output from the transmitting logic circuit 5, into the level of the amplitude of the supply voltage VPP relative to the reference potential VSS, after boosted and rectified by the rectifying circuit 9. Then, the level shifter 19 outputs the control signal to the switch 12 for back scattering.

The level of the supply voltage VPP is higher than the level of the internal supply voltage VDD. With this supply voltage VPP, the MOS transistor that provides the switch 12 for back scattering is turned on. In consequence, even if the receiving power is large, the on-resistance of the MOS transistor can be kept small and it is possible to attain a sufficient strength of back scattering.

In this way, in the fourth embodiment, stable communication is enabled, even when the receiving power becomes large due to a very short distance between the ID tag and the reader/writer in communication.

Fifth Embodiment

Figure 9:
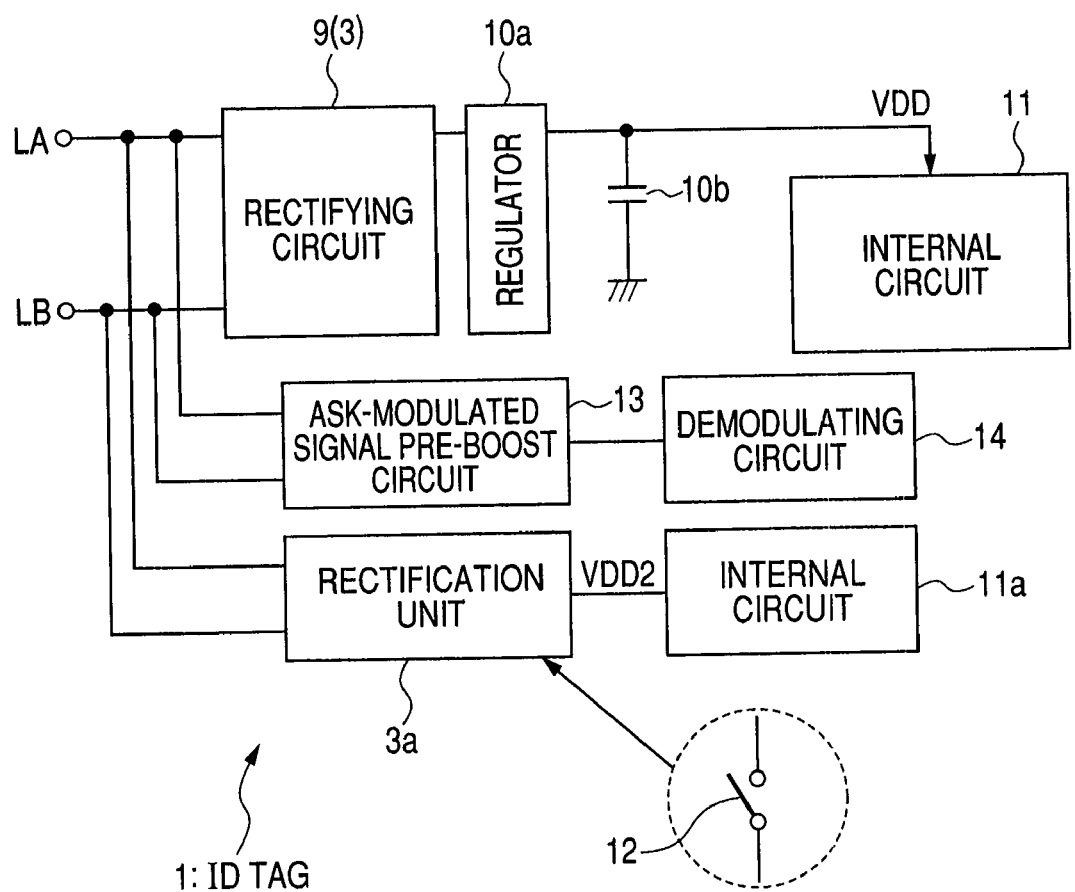
FIG. 9 is a block diagram showing an ID tag configuration according to a fifth embodiment of the present invention.

FIG. 9 is a block diagram showing an ID tag configuration according to a fifth embodiment of the present invention.

The ID tag of the fifth embodiment comprises a rectification unit 3, an internal circuit 11, an ASK-modulated signal pre-boost circuit 13, and a demodulating circuit 14 in the same configuration as for the above first embodiment shown in FIG. 2, and further includes another rectification unit 3a and another internal circuit 11a which is a second internal circuit, as shown in FIG. 9.

In the internal circuit 11, for example, a clock signal generating circuit or the like for generating a reference clock signal is provided. In the internal circuit 11a, other logic circuits such as a transmitting logic circuit 5, a receiving logic circuit 6, a control circuit 7, and a memory unit 8 are provided.

The rectification unit 3a has the same configuration as the rectification unit 3 (comprising a first rectifying circuit 9, a regulator 10a as a first voltage stabilizing circuit, and a static capacitor 10b). In particular, the rectification unit 3a comprises a rectification circuit as a second rectification circuit, a regulator as a first voltage stabilizing circuit, and a static capacitor. The switch 12 for back scattering is provided in the rectification unit 3a that supplies an internal supply voltage VDD2 to, for example, the internal circuit 11a.

When the switch 12 for back scattering is turned on, the rectification unit 3 without the switch 12 for back scattering can supply a more stable internal supply voltage VDD, as compared with the rectification unit 3a.

Hence, when the switch 12 for back scattering is turned on, a clock signal generating circuit provided in the internal circuit 11 can generate a stable reference clock signal with less frequency variation.

In this way, according to the fifth embodiment, it is possible to improve the communication performance of the ID tag 1.

While the invention made by the present inventors has been described specifically based on its embodiments hereinbefore, it will be appreciated that the present invention is not limited to the described embodiments and various modifications may be made without departing from the gist of the invention.

The present invention is suitable for a technology of communication between a reader/writer and an ID tag in an RFID system.

What is claimed is:

1. An ID tag that converts radio power received from a reader/writer into operating power and performs back scattering communication to transmit information to the reader/writer, the ID tag comprising:

an antenna for transmitting and receiving a radio signal to/from the reader/writer;

a power supply that is coupled to the antenna and generates a supply voltage (VDD);

an internal circuit to which the supply voltage is supplied; and a transceiver circuit that is coupled to the antenna in parallel with the power supply, wherein the transceiver circuit includes a boost circuit for boosting the radio signal from the reader/writer received by the antenna;

a rectifying circuit for detecting an envelope of a boosted signal outputted from the boost circuit;

a switch for back scattering that is coupled between an output terminal of the circuit and a reference potential;

a transmitting circuit for controlling operation of the switch for back scattering; and a receiving circuit for demodulating a detected signal outputted from the rectifying circuit.

2. The ID tag according to claim 1, further comprising a level shifter that converts the level of a control signal for controlling the operation of the switch for back scattering, wherein the level shifter provides the supply voltage generated by the voltage generator to drive the switch for back scattering.

3. An ID tag that converts radio power received from a reader/writer into operating power and performs back scattering communication to transmit information to the reader/writer, the ID tag comprising:
- an antenna for transmitting and receiving a radio signal to/from the reader/writer;
- a first power supply that is coupled to the antenna and generates a first supply voltage (VDD);
- an first internal circuit to which the first supply voltage is supplied;
- a transceiver circuit that is coupled to the antenna in parallel with the voltage generator;
- a second power supply that is coupled to the antenna and generates a second supply voltage (VDD2); and
- an second internal circuit to which the first supply voltage is supplied;
- wherein a switch for back scattering is provided in the second power supply, and
- wherein the transceiver circuit includes a boost circuit for boosting the radio signal from the reader/writer received by the antenna;
- a rectifying circuit for an envelope detection of a boosted signal outputted from the boost circuit;
- a transmitting circuit for controlling operation of the switch for back scattering; and
- a receiving circuit for demodulating a detected signal outputted from the rectifying circuit.

4. The ID tag according to claim 3, wherein the second internal circuit is memory circuit.

5. The ID tag according to claim 3,
- wherein the first internal circuit comprises a clock generating circuit that generates and supplies a reference clock to logic circuits, and
- wherein the second internal circuit comprises the logic circuits.

6. An ID tag that converts radio power received from a reader/writer into operating power and performs back scattering communication to transmit information to the reader/writer, the ID tag comprising:
- an antenna for transmitting and receiving a radio signal to/from the reader/writer;
- a power supply that is coupled to the antenna and generates a supply voltage (VDD);
- an internal circuit to which the supply voltage is supplied; and
- a transceiver circuit that is coupled to the antenna in parallel with the power supply,
- wherein the transceiver circuit includes a boost circuit for boosting the radio signal from the reader/writer received by the antenna;
- a rectifying circuit for detecting an envelope of a boosted signal outputted from the boost circuit;
- a switch for back scattering that is coupled between an output terminal of the rectifying circuit and a reference potential;
- a transmitting circuit for controlling operation of the switch for back scattering; and
- a receiving circuit for demodulating a detected signal outputted from the rectifying circuit.

* * * * *